United States Patent
Schmidt

(10) Patent No.: US 10,125,897 B2
(45) Date of Patent: Nov. 13, 2018

(54) PIPE CLAMP

(71) Applicant: Oatey Co., Cleveland, OH (US)

(72) Inventor: Matthew L Schmidt, Avon, OH (US)

(73) Assignee: OATEY CO., Cleveland, OH (US)

( * ) Notice: Subject to any disclaimer, the term of this patent is extended or adjusted under 35 U.S.C. 154(b) by 0 days.

(21) Appl. No.: 15/346,440

(22) Filed: Nov. 8, 2016

(65) Prior Publication Data

US 2017/0051850 A1  Feb. 23, 2017

Related U.S. Application Data

(60) Continuation of application No. 14/536,774, filed on Nov. 10, 2014, now abandoned, which is a division of application No. 13/100,074, filed on May 3, 2011, now Pat. No. 8,882,059.

(60) Provisional application No. 61/331,134, filed on May 4, 2010.

(51) Int. Cl.
| | |
|---|---|
| F16L 3/08 | (2006.01) |
| F16L 3/13 | (2006.01) |
| F16L 3/10 | (2006.01) |
| F16L 3/04 | (2006.01) |

(52) U.S. Cl.
CPC .......... *F16L 3/13* (2013.01); *F16L 3/04* (2013.01); *F16L 3/1041* (2013.01)

(58) Field of Classification Search
CPC ........................................................ F16L 3/04
See application file for complete search history.

(56) References Cited

U.S. PATENT DOCUMENTS

| | | |
|---|---|---|
| 4,260,123 A | 4/1981 | Ismert |
| 4,840,334 A | 6/1989 | Kikuchi |
| 4,903,920 A | 2/1990 | Merritt |
| 4,903,921 A | 2/1990 | Logsdon |
| 5,054,741 A | 10/1991 | Ismert |
| 5,353,841 A | 10/1994 | Mathison et al. |
| 5,385,320 A | 1/1995 | Ismert et al. |
| 5,460,342 A | 10/1995 | Dore et al. |
| 5,739,474 A | 4/1998 | Bradley |
| 6,010,100 A * | 1/2000 | Merritt ............ F16L 3/04 248/71 |
| 6,073,891 A | 6/2000 | Humber |
| 6,164,604 A | 12/2000 | Cirino et al. |
| 6,666,415 B2 | 12/2003 | Hansen |
| 7,207,530 B2 | 4/2007 | Ismert et al. |
| 7,219,931 B2 | 5/2007 | Kato |
| 7,658,350 B2 | 2/2010 | Bauer |
| 7,802,762 B2 | 9/2010 | Bauer |
| 7,896,296 B2 | 3/2011 | Julian et al. |
| 8,733,709 B2 | 5/2014 | Meyers |
| 2006/0027276 A1 | 2/2006 | Main |

* cited by examiner

*Primary Examiner* — Amy J. Sterling
(74) *Attorney, Agent, or Firm* — Baker & Hostetler LLP

(57) ABSTRACT

A pipe clamp comprises a mounting post having a flexible arm extending laterally therefrom in a semi-circular arc. The arm defines with the mounting post an arcuate recess having spaced apart opposite ends between which different size pipe is selectively insertable into the recess. Opposed flexible fingers extend radially inwardly adjacent opposite ends of the recess. The fingers are axially angled between opposite sides of the clamp to facilitate bending of the fingers when contacted by the pipe during insertion of the pipe into the recess.

24 Claims, 7 Drawing Sheets

PIPE CLAMP

CROSS-REFERENCE TO RELATED APPLICATIONS

This application is a Continuation of U.S. application Ser. No. 14/536,774, filed Nov. 10, 2014, which is a Divisional of U.S. application Ser. No. 13/100,074, filed May 3, 2011, now U.S. Pat. No. 8,882,059, which claims the benefit of U.S. Provisional Application No. 61/331,134, filed May 4, 2010, the disclosures of which are incorporated herein by reference.

FIELD OF THE INVENTION

This invention relates generally to a pipe clamp for selectively gripping and attaching different size pipe (including tubing) to a suitable support structure.

SUMMARY OF THE INVENTION

The pipe clamp of the present invention includes a mounting post having a flexible arm extending laterally outwardly therefrom in a semi-circular arc. The arm defines with the mounting post an arcuate recess sized for selective receipt of different size pipe through spaced apart opposite ends of the recess.

In accordance with one aspect of the invention, opposed flexible fingers extend radially inwardly adjacent the opposite ends of the recess toward the axial center thereof. Also such fingers are axially inwardly inclined from one side of the clamp toward the other side for ease of bending of the fingers when contacted by the pipe during insertion of the pipe into the recess and secure retention of the pipe in the recess by the fingers.

In accordance with another aspect of the invention, a pair of circumferentially spaced, axially extending ribs may be provided on the inner surface of the recess intermediate the opposite ends thereof for cradling the pipe when inserted into the recess.

In accordance with another aspect of the invention, a rib may extend inwardly from the inner surface of the recess in closely spaced substantially parallel relation to an inner side edge of each of the fingers for guiding the bending of the fingers when contacted by the pipe during insertion of the pipe into the recess.

In accordance with another aspect of the invention, the mounting post has a bottom surface that may extend below the pipe when fully inserted into the recess to provide a clearance space between the pipe and a mounting surface when the clamp is attached to the mounting surface with the bottom surface of the mounting post in engagement with the mounting surface.

In accordance with another aspect of the invention, the outermost end of the arm may have a beveled tip that extends below the bottom surface of the mounting post when the clamp is in a fully relaxed condition and after a smaller size pipe is fully inserted into the recess, whereby when the clamp with smaller size pipe is attached to the mounting surface with the bottom surface of the mounting post engaging the mounting surface, the beveled tip is cammed inwardly toward the mounting post to cause the arm to more tightly grip the smaller size pipe.

DETAILED DESCRIPTION OF THE INVENTION

Figure 1:
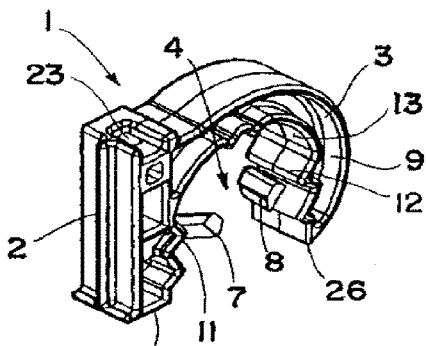
FIG. 1 is a perspective view of one form of pipe clamp of the present invention.

Referring now in detail to the drawings, and initially to FIGS. 1-5, there is shown one form of pipe clamp 1 of the present invention for selectively mounting different size pipe (including for example PEX, CPVC and copper pipe) off a suitable mounting surface such as a vertical stud or horizontal floor or ceiling joist or the like.

Pipe clamp 1 may be molded out of a suitable plastic material such as high impact ABS, and includes a mounting post 2 and integrally molded flexible arm 3 extending laterally outwardly therefrom in an arc which as shown is greater than 180°. Arm 3 defines with mounting post 2 an arcuate recess 4 having spaced apart opposite ends 5, 6 between which the different size pipe may be selectively insertable and securely retained within the recess as described hereafter.

Recess 4 has a radius of curvature substantially greater than the radius of the different size pipe that may be selectively retained therein. For example, recess 4 may have a radius of approximately 0.50 inch when used for selectively retaining ½ inch or ¾ inch pipe. By varying the dimensions of the pipe clamp, the pipe clamp may be used to selectively retain other size pipe as well.

Adjacent the opposite ends 5, 6 of recess 4 are flexible fingers 7, 8 that extend radially inwardly toward the axial center of the recess. In addition, such fingers are axially inwardly inclined from one side 9 of the clamp toward the other side 10 (see FIGS. 1-3 and 5) for ease of bending of the fingers when contacted by the pipe during insertion of the pipe into the recess and secure retention of the pipe in the recess by the fingers.

Figure 8:
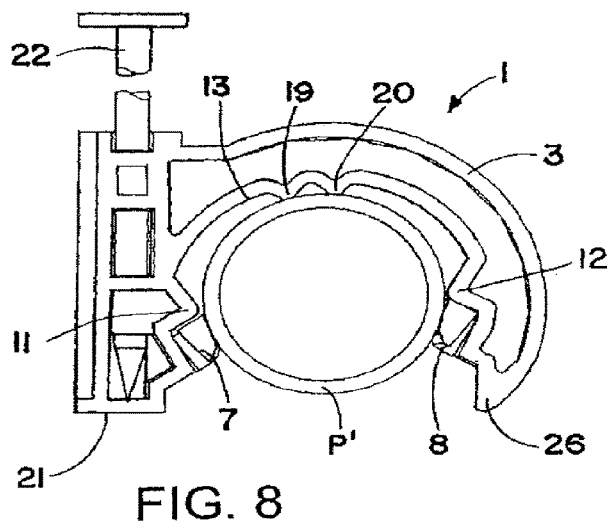
FIG. 8 is an enlarged schematic side view of the pipe clamp of FIG. 2 shown snap fitted onto a larger size pipe prior to attaching the pipe clamp to a mounting surface.

A rib 11, 12 may extend inwardly from the inner surface 13 of the recess in closely spaced substantially parallel relation to an inner side edge of the respective fingers 7, 8 for guiding the bending of the fingers when contacted by the pipe particularly during insertion of a larger size pipe into the recess as shown in FIG. 8. Also 15 the fingers may be chamfered to provide for progressive engagement of the fingers with the pipe during insertion of the pipe into the recess.

Figure 6:
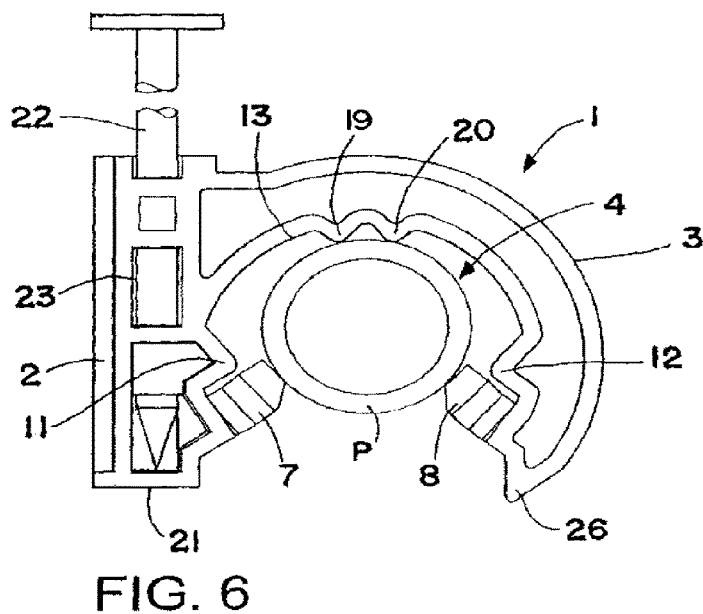
FIG. 6 is an enlarged schematic side view of the pipe clamp of FIG. 2 shown snap fitted onto a smaller size pipe prior to attaching the pipe clamp to a mounting surface.

Because the radius of recess 4 is substantially greater than the radius of the different size pipe selectively retained thereby, a pair of circumferentially spaced, axially extending ribs 19, 20 are desirably provided on the inner surface 13 of the recess intermediate opposite ends thereof for cradling the different size pipe P and P' when the clamp is snap fitted onto the pipe as shown, for example, in FIGS. 6 and 8. Once the pipe clamp is properly secured to the pipe, the pipe clamp may be attached to a suitable mounting surface S by pressing the bottom surface 21 of the mounting post 2 (which is desirably substantially flat as shown) up against the mounting surface and driving a suitable fastener such as a nail 22 through a fastener hole 23 in the mounting post into the mounting surface as shown in FIGS. 7 and 9.

Figure 7:
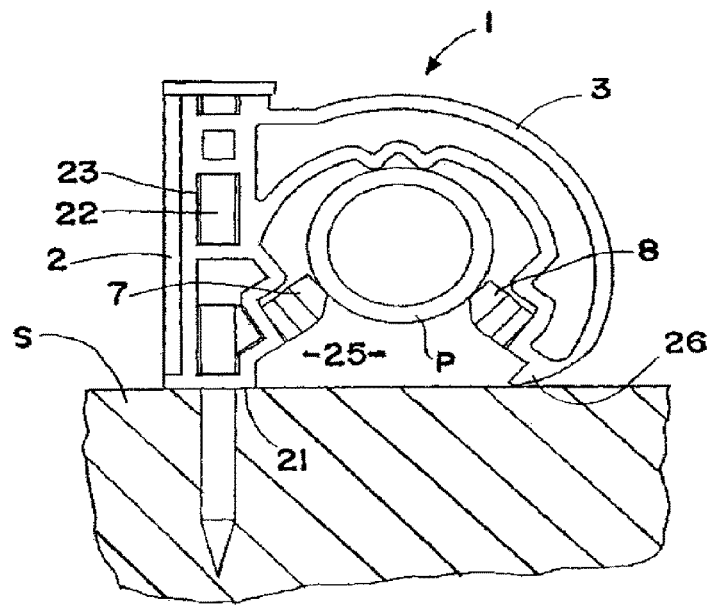
FIG. 7 is an enlarged schematic side view of the pipe clamp of FIG. 6 shown attached to a mounting surface by a fastener extending through a fastener hole in the clamp mounting post.
Figure 9:
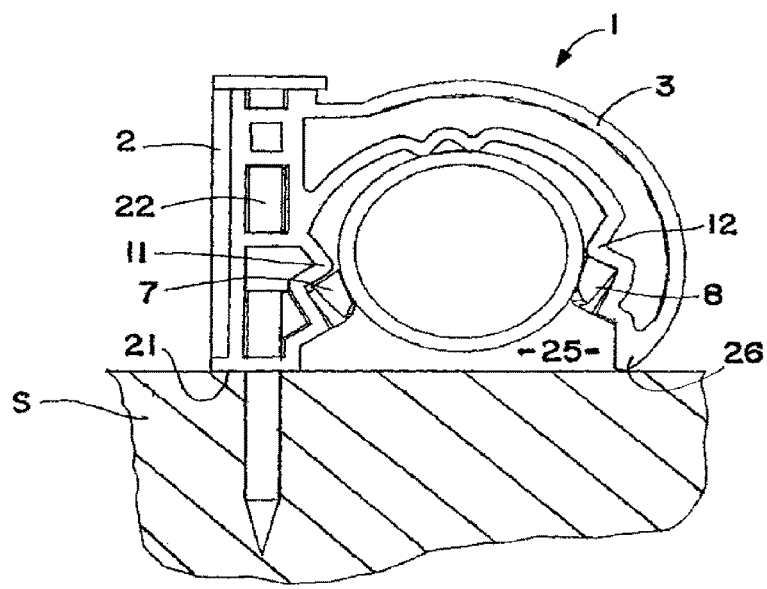
FIG. 9 is an enlarged schematic side view of the pipe clamp of FIG. 8 shown attached to a mounting surface by a fastener extending through a fastener hole in the clamp mounting post.
Figure 10:
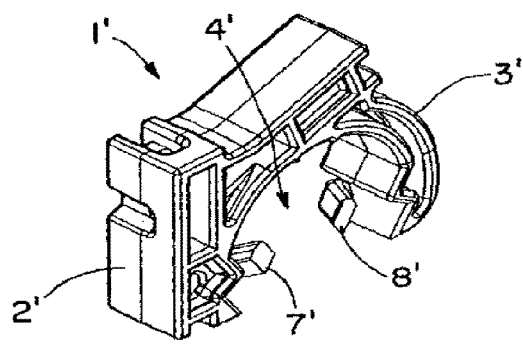
FIG. 10 is a perspective view of another form of pipe clamp of the present invention.
Figure 11:
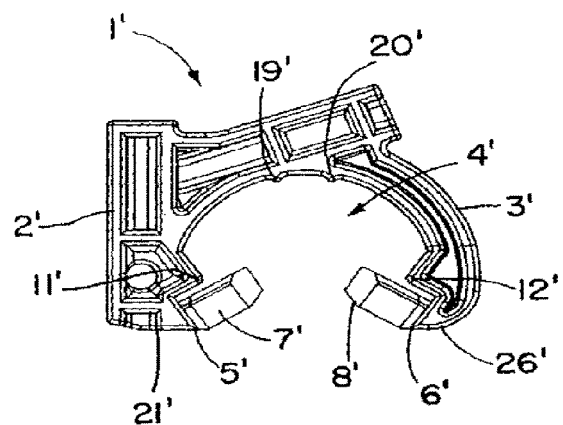
FIG. 11 is a side view of the pipe clamp of FIG. 10 as seen from the right side thereof
Figure 12:
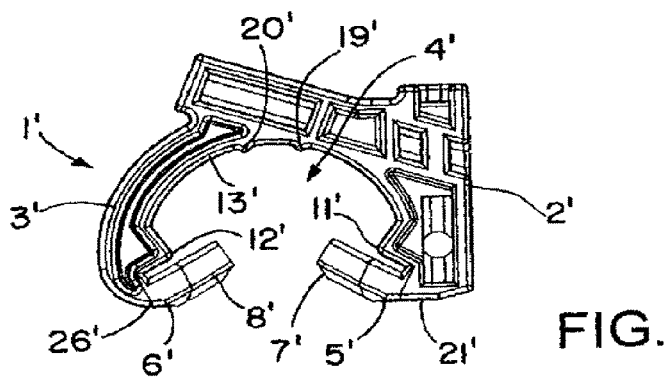
FIG. 12 is a side view of the opposite side of the pipe clamp of FIGS. 10 and 11.
Figure 13:
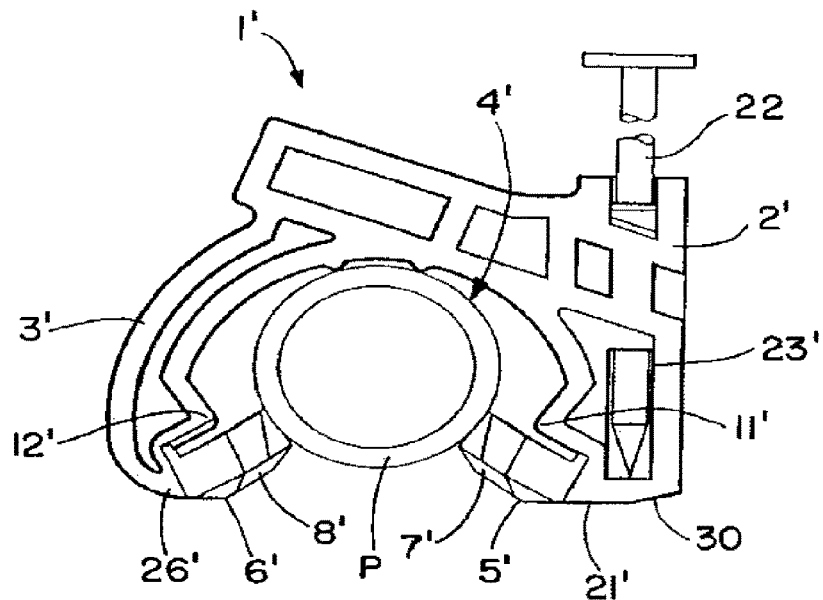
FIG. 13 is an enlarged schematic side view of the pipe clamp of FIG. 12 shown snap fitted onto a smaller size pipe prior to attaching the pipe clamp to a mounting surface.

As also shown in FIGS. 7 and 9, the bottom surface 21 of mounting post 2 desirably extends below the pipe, regardless of whether the pipe is the smaller size shown in FIG. 7 or the larger size shown in FIG. 9, to provide a clearance space 25 between the pipe and mounting surface when the mounting post is attached to the mounting surface to allow for expansion of the pipe, eliminate contact between the pipe and the mounting surface and insulate against sound and vibration. If desired, the fastener hole 23 may be slightly undersized to permit the fastener to be preloaded in the fastener hole thus eliminating the need to have to hold the fastener.

Figure 2:
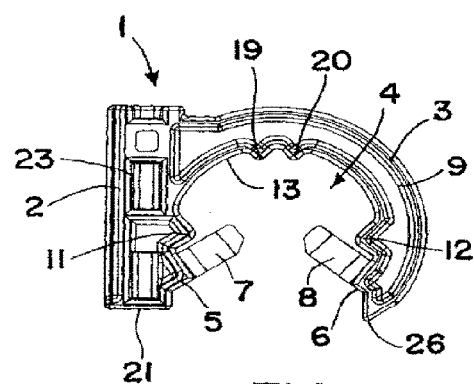
FIG. 2 is a side view of the pipe clamp of FIG. 1 as seen from the right side of FIG. 1.
Figure 3:
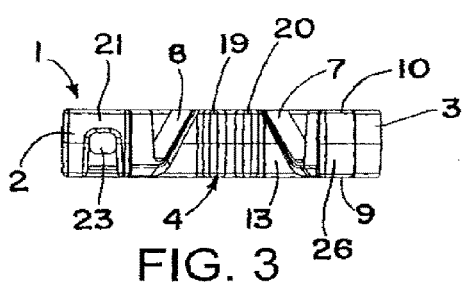
FIG. 3 is a bottom plan view of the pipe clamp of FIG. 2.
Figure 4:
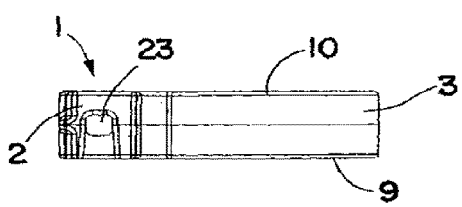
FIG. 4 is a top plan view of the pipe clamp of FIG. 2.
Figure 5:
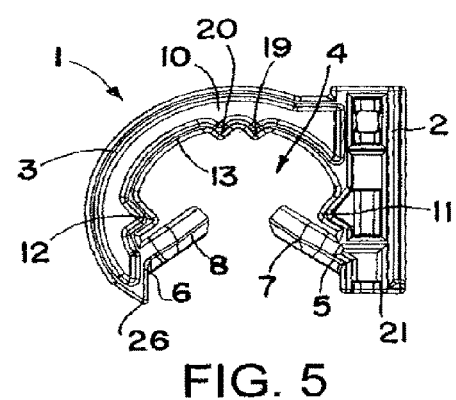
FIG. 5 is a side view of the opposite side of the pipe clamp of FIGS. 1 and 2.

The outermost end of arm 3 may have a beveled tip 26 which, when the clamp 1 is in the fully relaxed condition, extends slightly below the bottom surface 21 of the mounting post 2 as shown in FIGS. 2 and 5. Likewise, when the clamp is snap fitted onto a smaller size pipe P, the beveled tip 26 may still extend below the bottom surface of the mounting post as schematically shown in FIG. 6. This has the advantage that after the pipe clamp is snap fitted onto the smaller size pipe and the pipe clamp is attached to a mounting surface with the bottom surface of the mounting post engaging the mounting surface, the beveled tip 26 will be cammed inwardly toward the mounting post to cause the arm to more tightly grip the pipe as schematically shown in FIG. 7.

However, when the pipe clamp 1 is snap fitted onto a larger size pipe P', the arm 3 is expanded radially outwardly preferably to bring the tip 26 into substantial alignment with the bottom surface 21 of the mounting post 2 as schematically shown in FIG. 8. Accordingly, when the pipe clamp with the larger size pipe fully inserted into the recess is attached to the mounting surface S with the bottom surface of the mounting post engaging the mounting surface, the tip 26 will also firmly engage the mounting surface as schematically shown in FIG. 9.

FIGS. 10-18 show another form of pipe clamp 1' of the present invention that is substantially similar to the pipe clamp 1 previously described. Accordingly, the same reference numbers followed by a prime symbol are used to designate like parts.

Pipe clamp 1', like pipe clamp 1, is for selectively mounting different size pipe off a suitable mounting surface such as a vertical stud or horizontal floor or ceiling joist or the like and includes flexible fingers 7', 8' adjacent opposite ends 5', 6' of recess 4' that extend radially inwardly adjacent the opposite ends of the recess. the fingers being axially and radially inwardly inclined toward the axial center of the recess from one side of the clamp toward the opposite side to facilitate radial and axial inward bending of the fingers when contacted by the pipe during insertion of the pipe into the recess for securely retaining the pipe in the recess. A rib 11', 12' may extend inwardly from the inner surface 13' of the recess in closely spaced substantially parallel relation to an inner side edge of the respective fingers, 7', 8' for guiding the radial and axial inward bending of the fingers when contacted by the pipe during insertion of the pipe into the recess. A pair of circumferentially spaced, axially extending ribs 19', 20' are desirably provided on the radial inner surface 13' of the recess intermediate opposite ends thereof for cradling the different size pipe P and P' when the clamp is snap fitted onto the pipe as shown. For example, in FIGS. 14 and 16.

Figure 14:
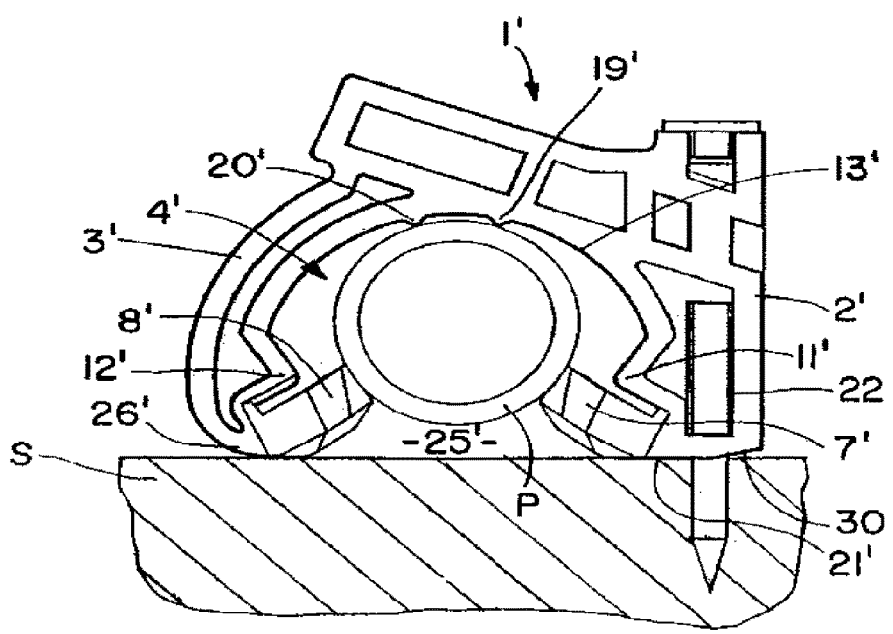
FIG. 14 is an enlarged schematic side view of the pipe clamp of FIG. 13 shown attached to a mounting surface by a fastener extending through a fastener hole in the clamp mounting post.

However, pipe clamp 1' differs from pipe clamp 1 in that the outermost end 26' of the arm 3' of pipe clamp 1' is desirably in substantial alignment with the bottom surface 21' of the mounting post 2' when in the fully relaxed condition shown in FIGS. 10-13. Accordingly, when the clamp 1' with a smaller size pipe P fully inserted into the arcuate recess 4' is attached to a mounting surface S with the bottom surface 21' of the mounting post 2' engaging the mounting surface, the outermost end 26' of arm 3' will also engage the mounting surface as schematically shown in FIG. 14. In this example, the bottom surface 21' of the mounting post 2' still extends below the smaller size pipe P to provide a clearance space 25' between the pipe and the mounting surface as further shown in FIG. 14.

Figure 15:
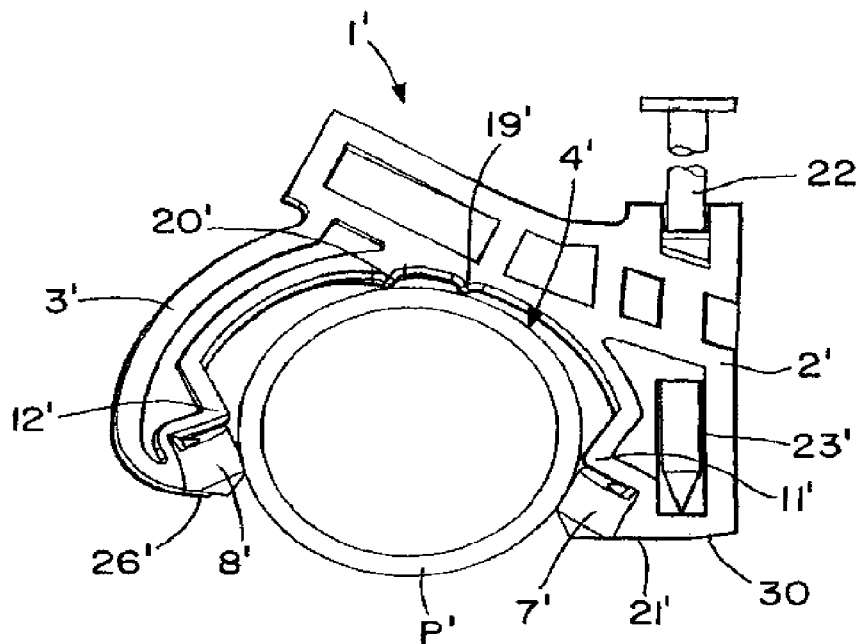
FIG. 15 is an enlarged schematic side view of the pipe clamp of FIG. 12 shown snap fitted onto a larger size pipe prior to attaching the pipe clamp to a mounting surface.
Figure 16:
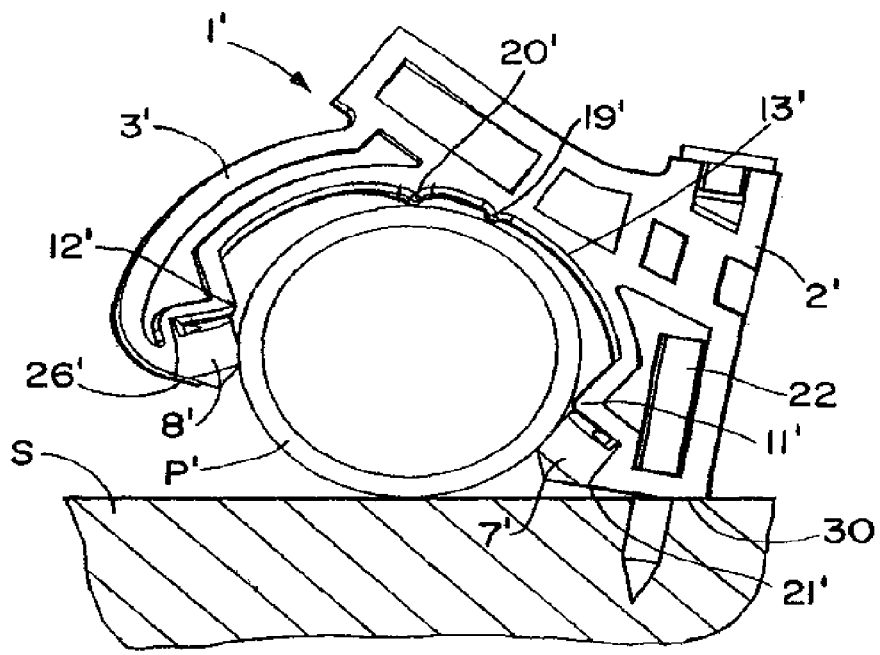
FIG. 16 is an enlarged schematic side view of the pipe clamp of FIG. 15 shown attached to a mounting surface by a fastener extending through a fastener hole in the clamp mounting post.

However, the bottom surface 21' of the mounting post 2' of pipe clamp 1' is substantially in line with the opposite ends 5', 6' of the arcuate recess 4'. Accordingly, when the pipe clamp 1' is snap fitted onto a larger size pipe P', the outer diameter of the larger size pipe protrudes outwardly beyond the bottom surface 21' of the mounting post 2' as shown in FIG. 15. Also the outermost end 26' of the arm 3' is expanded radially outwardly such that the outer diameter of the larger size pipe P' extends somewhat further outwardly beyond the outermost end 26' of the arm 3' as further shown in FIG. 15. Moreover, the bottom surface 21' of the mounting post 2' desirably has a tapered outer surface 30 that is in substantial alignment with the outwardly protruding outer diameter of the larger size pipe P' when fully inserted into the recess 4'. Thus, when the pipe clamp 1' with the larger size pipe fully inserted into the recess 4' is attached to the mounting surface S as by driving a suitable fastener 22 through the fastener hole 23' in the mounting post 2' into the mounting surface, the tapered outer surface 30 of the mounting post 2' and the outwardly protruding outer diameter of the larger size pipe P are clamped against the mounting surface as schematically shown in FIG. 16.

Figure 17:
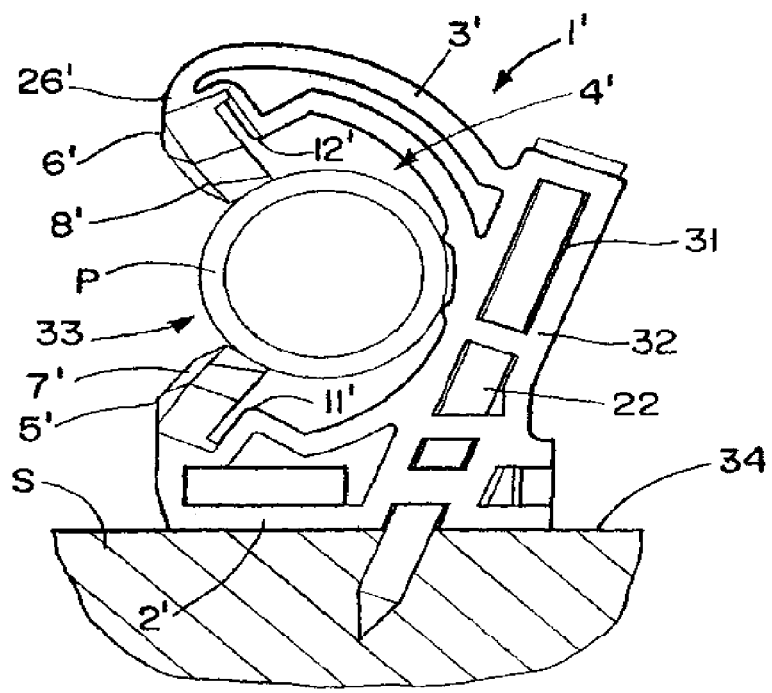
FIGS. 17 and 18 are enlarged schematic side views of the pipe clamp of FIGS. 13 and 15 shown attached to a mounting surface by a fastener extending through another fastener hole in the pipe clamp extending at an obtuse angle to the flat outer surface of the mounting post.
Figure 18:
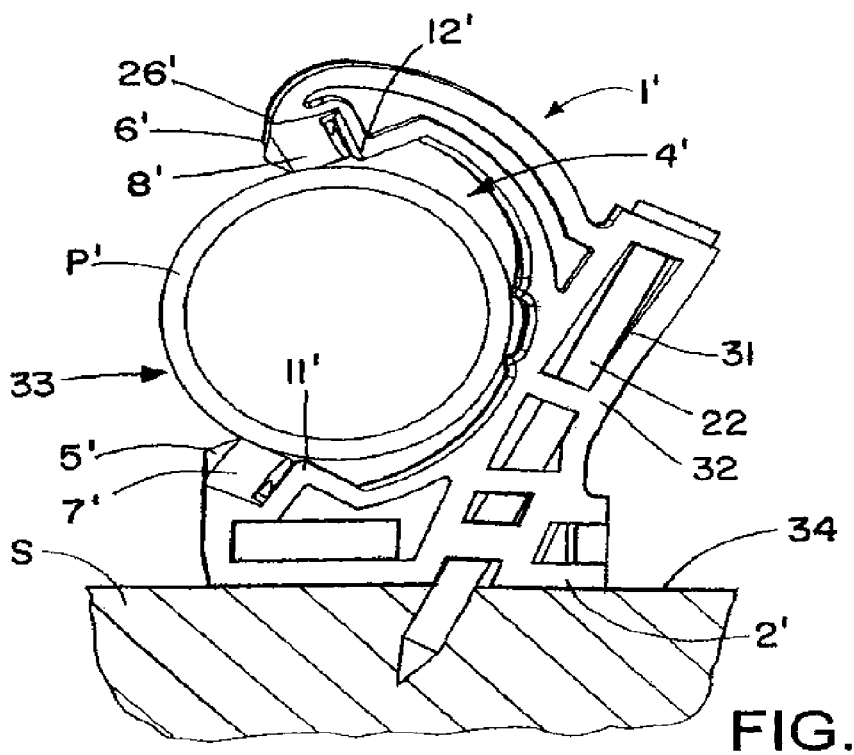

Pipe clamp 1' may also have another fastener hole 31 extending through a portion 32 of the arm 3' opposite the opening 33 between the spaced apart ends 5', 6' of the recess 4' and out the flat outer surface 34 of the mounting post 2' to permit the pipe clamp 1' to be attached to the mounting surface S by pressing the flat outer surface 34 of the mounting post 2' up against the mounting surface and driving a suitable fastener such as a nail 22 through the fastener hole 31 into the mounting surface as schematically shown in FIGS. 17 and 18. Preferably the fastener hole 31 is at an obtuse angle of, for example, about 110° to the flat outer surface 34 of the mounting post 2', whereby when the pipe clamp 1' is attached to the side of a horizontal floor or ceiling joist or the like, the pipe clamp can be oriented to make it easier to drive a fastener through the angled fastener hole 31 into the joist using a hammer or the like.

Although the invention has been shown and described with respect to a certain embodiment, it is obvious that equivalent alterations and modifications will occur to others skilled in the art upon the reading and understanding of the specification. In particular, with regard to the various functions performed by the above-described components, the terms used to describe such components are intended to correspond, unless otherwise indicated, to any component which performs the specified function of the desired component (e.g., that is functionally equivalent), even though not structurally equivalent to the disclosed component which performs the function of the herein illustrated exemplary embodiment of the invention. In addition, while a particular feature of the invention may have been disclosed with respect to only one embodiment, such feature may be combined with one or more other features as may be desired and advantageous for any given or particular application.

What is claimed is:

1. A pipe clamp for selectively supporting a pipe from a mounting surface, the pipe clamp having a first side and a second side spaced from the first side in an axial direction, the clamp comprising:
    a mounting post, and a flexible arm extending in a first lateral direction from the mounting post in a semi-circular arc, the arm and the mounting post together defining an arcuate recess having a first end and a second end spaced apart from the first end in the first lateral direction, the first and second sides of the pipe clamp each including a portion of the arm and the mounting post, the pipe being selectively insertable between the first and second ends and into the recess along an insertion direction, the axial direction, the first lateral direction, and the insertion direction being substantially perpendicular to each other,
    a first flexible finger extending from the first end of the recess at least partially in the axial direction and at least partially in the first lateral direction, and
    a second flexible finger extending from the second end of the recess at least partially in the axial direction and at least partially in a second lateral direction, the second lateral direction being substantially opposite to the first lateral direction,
    wherein the first and second fingers are configured to bend when contacted by the pipe during insertion of the pipe into the recess for securely retaining the pipe in the recess,
    wherein the pipe clamp is configured to be mounted to the mounting surface by driving a fastener through the mounting post along a mounting direction that is substantially opposite the insertion direction.

2. The clamp of claim 1 further comprising a pair of circumferentially spaced ribs extending in the axial direction along an inner surface of the recess intermediate the first and second ends thereof for cradling the pipe when inserted into the recess.

3. The clamp of claim 1 further comprising a rib extending inwardly from an inner surface of the recess in closely spaced, substantially parallel relation to an inner side edge of each of the fingers for guiding the bending of the fingers when contacted by the pipe during insertion of the pipe into the recess.

4. A pipe clamp for selectively supporting a pipe from a mounting surface, the clamp comprising:
    a mounting post, and a flexible arm extending laterally from the mounting post in a semi-circular arc, the arm and the mounting post together defining an arcuate recess having spaced apart ends separated along a first direction, the pipe being selectively insertable between the ends and into the recess along an insertion direction,
    opposed flexible fingers extending radially inwardly adjacent the ends of the recess, the fingers being axially angled between opposite sides of the clamp that each include a portion of the mounting post and a portion of the flexible arm, the opposite sides being separated along a second direction perpendicular to the first direction, such that the fingers bend when contacted by the pipe during insertion of the pipe into the recess for securely retaining the pipe in the recess,
    wherein the pipe clamp is configured to be mounted to the mounting surface by driving a fastener through the mounting post along a mounting direction that is substantially opposite the insertion direction, wherein the fingers are chamfered.

5. The clamp of claim 1 wherein the mounting post has a bottom surface that extends below a smaller size pipe when fully inserted into the recess to provide a clearance space between the pipe and the mounting surface when the clamp is attached to the mounting surface with the bottom surface of the mounting post in engagement with the mounting surface.

6. The clamp of claim 5 wherein an outermost end of the arm is in substantial alignment with the bottom surface of the mounting post when the clamp is in a fully relaxed condition and after a smaller size pipe is fully inserted into the recess, whereby when the clamp with the smaller size pipe fully inserted into the recess is attached to the mounting surface with the bottom surface of the mounting post engaging the mounting surface, the outermost end of the arm engages the mounting surface.

7. The clamp of claim 1 wherein when a larger size pipe is fully inserted into the recess, an outer diameter of the larger size pipe protrudes outwardly beyond a bottom surface of the mounting post, whereby when the clamp with the larger size pipe fully inserted into the recess is attached to the mounting surface with the bottom surface of the mounting post engaging the mounting surface, the outwardly protruding outer diameter of the large size pipe is clamped against the mounting surface.

8. The clamp of claim 7 wherein the bottom surface of the mounting post has a tapered outer surface that is in substantial alignment with the outwardly protruding outer diameter of the larger size pipe when the larger size pipe is fully inserted into the recess, whereby both the tapered outer surface of the mounting post and the outwardly protruding outer diameter of the larger size pipe are clamped against the mounting surface when the clamp with the larger size pipe fully inserted into the recess is attached to the mounting surface.

9. The clamp of claim 1 wherein the mounting post has a bottom surface, and a fastener hole extends through the mounting post and out the bottom surface for attaching the bottom surface of the mounting post to the mounting surface.

10. The clamp of claim 9 wherein another fastener hole extends through a portion of the arm opposite an opening between the spaced apart ends of the arcuate recess at an obtuse angle to a flat outer surface of the mounting post for attaching the flat outer surface of the mounting post to the mounting surface.

11. The pipe clamp of claim 1, wherein the first and second ends of the recess are spaced from one another along an axis that is substantially parallel to the lateral direction.

12. A pipe clamp for selectively clamping a pipe to a mounting surface, the pipe clamp comprising:
a mounting post having a first end and a second end spaced from the first end along a first mounting direction, the mounting post having a hollow interior between the ends that is configured to receive a fastener,
a flexible arm extending in a lateral direction from the first end of the mounting post to an outermost end of the flexible arm, the flexible arm extending in an arc, such that the flexible arm defines a pipe receiving recess between the mounting post and the outermost end;
a first side and a second side spaced from the first side in an axial direction that is perpendicular to the mounting direction and the lateral direction, each of the first and second sides including a portion of the mounting post and a portion of the flexible arm;
a first pipe-receiving feature and a second pipe-receiving feature associated with each one of the mounting post and the flexible arm, each of the first and second pipe-receiving features extending into the recess and extending at least partially in the axial direction, the first and second pipe receiving features being configured to contact an outer surface of the pipe so as to retain the pipe within the recess,
wherein the pipe clamp is configured to be secured to the mounting surface by driving a fastener through the mounting post along the first direction.

13. The pipe clamp of claim 12, wherein when the outermost end contacts the mounting surface, the flexible arm will be cammed inwardly toward the mounting post to cause the arm to more tightly grip the pipe.

14. The pipe clamp of claim 12, wherein the pipe receiving feature comprises a pair of flexible fingers that extend inwardly from the flexible arm toward the recess.

15. A pipe clamp for selectively clamping a pipe to a mounting surface, the pipe clamp comprising:
a mounting post having a first end and a second end spaced from the first end along a first direction, the mounting post having a hollow interior between the ends that is configured to receive a fastener,
a flexible arm extending laterally from the first end of the mounting post to an outermost end of the flexible arm, the flexible arm extending in an arc, such that the flexible arm defines a pipe receiving recess between the mounting post and the outermost end;
opposed sides that are spaced along a second direction that is perpendicular to the first direction, each of the opposed sides including a portion of the mounting post and a portion of the flexible arm;
pipe-receiving features associated with each one of the mounting post and the flexible arm, each of the pipe-receiving features extending into the recess and having an angular dimension with respect to the second direction, the pipe receiving features being configured to contact an outer surface of the pipe so as to retain the pipe within the recess,
wherein the pipe clamp is configured to be secured to the mounting surface by driving a fastener through the mounting post along the first direction,
wherein the pipe receiving feature comprises a pair of flexible fingers that extend inwardly from the flexible arm toward the recess, wherein the flexible fingers are compressible in an outward direction extending from the recess to the flexible arm, such that a portion of each one of the fingers will compress against the outer surface of the pipe when the pipe is inserted into the recess.

16. The pipe clamp of claim 12, wherein the pipe is a large diameter pipe and the second end of the mounting post includes a tapered outer surface, such that when the large diameter pipe is inserted into the recess, the tapered outer surfacing is in substantial alignment with an outwardly protruding portion of the outer surface of the large diameter pipe.

17. The pipe clamp of claim 16, wherein driving the fastener through the mounting post along the first direction will cause the large diameter pipe and the tapered outer surface to be clamped directly against the mounting surface.

18. The pipe clamp of claim 12, wherein the mounting direction is substantially perpendicular to the mounting surface.

19. The pipe clamp of claim 12, wherein the mounting direction is a first mounting direction, wherein the pipe clamp defines an opening between the mounting post and the outmost end that flexible arm, the opening being adjacent to the recess, and wherein the mounting arm has a portion opposite the opening that includes a second hollow interior configured to receive a fastener along a second mounting direction that is different than the first mounting direction so as to mount the pipe clamp to the mounting surface.

20. The pipe clamp of claim 19, wherein the second mounting direction is at an obtuse angle of about 110° to the mounting surface.

21. The pipe clamp of claim 19, wherein the fastener is a nail and is driven through either one of the mounting post or the portion opposite the opening so as to securably mount the pipe clamp to the mounting surface.

22. The pipe clamp of claim 12, wherein the outermost end is spaced from the mounting post along an axis that is substantially parallel to the lateral direction.

23. The pipe clamp of claim 1, wherein both the first flexible finger and the second flexible finger are chamfered.

24. The pipe claims of claim 1, wherein both the first flexible finger and the second flexible finger extend at least partially in the insertion direction.

* * * * *